April 5, 1966 W. R. REACH 3,244,352
CONTAINERS FOR ARTICLES TO BE DISPENSED
IN VENDING APPARATUS
Original Filed July 6, 1964
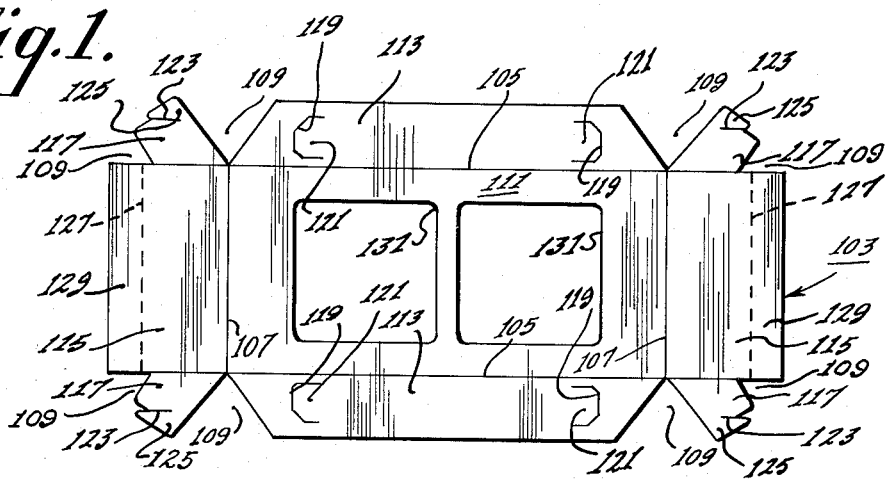
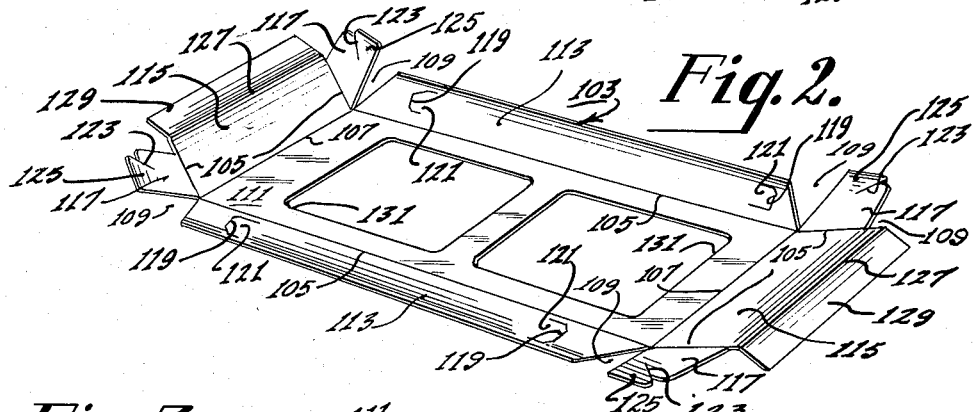
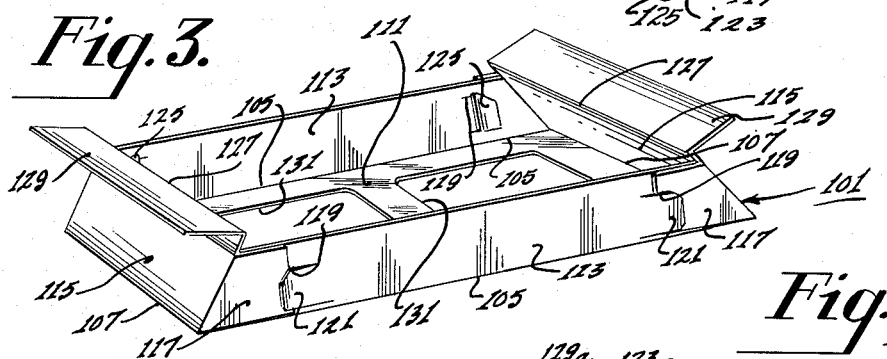
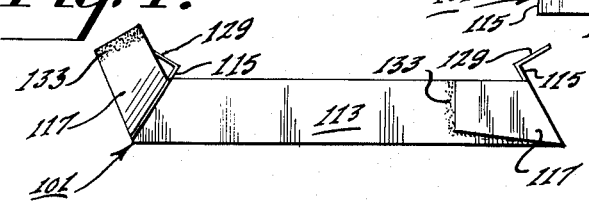
INVENTOR.
Walter R. Reach
BY
ATTORNEY.

United States Patent Office 3,244,352
Patented Apr. 5, 1966

3,244,352
CONTAINERS FOR ARTICLES TO BE DISPENSED
IN VENDING APPARATUS
Walter R. Reach, 588 Washington Terrace,
Audubon, N.J.
Original application July 6, 1964, Ser. No. 380,456.
Divided and this application May 4, 1965, Ser. No. 453,124
3 Claims. (Cl. 229—32)

This invention relates to containers for packaging articles to be dispensed, and particularly to containers for articles to be dispensed in vending apparatus of the type disclosed in my copending application, Ser. No. 380,456, filed July 6, 1964, of which the present application is a division.

There are a number of comestible products which, while quite edible in the cold state (i.e., at room temperature), are found to be more palatable and inviting when warmed to a higher temperature. Among such products are the so-called soft pretzels made of dough. Such pretzels can be prepared in various ways for vending, one such way, for example, being disclosed in Reach Patent 3,026,824. According to the method of this patent, the pretzels can be baked and delivered immediately in the hot state by an attendant at the baking premises.

In some cases, it may be desirable to pre-bake and store the pretzels or other comestible products for subsequent heating and vending. This is particularly desirable when there is no attendant at the premises. Again, in anticipation of large and more or less concentrated demand for the pretzels at sports stadiums, market places, or the like, it may be desirable to pre-bake a large quantity of the soft pretzels and store them for later delivery to consumers on demand. Stored pretzels will, of course, become cold; and in the case of soft pretzels, if they are stored for a time, they may absorb moisture from the ambient and become soggy and unpalatable. To make them attractive to customers, they must be heated again (1) to drive off excess moisture without, however, making them altogether dry and crisp, and (2) to render them just warm enough to be pleasingly palatable.

In the above-identified, copending application, there is disclosed coin-controlled vending apparatus in which packaged products, such as soft pretzels or other comestible products, can be stored in vertically stacked relation to be discharged from the stack, one by one, and transferred to a heating station for a predetermined time before delivery to a purchaser. To accomplish this successfully, it is essential that the products be packaged in containers that will insure safe storage and handling thereof and that will permit efficient heating of the packaged products both from above and from below so as to provide substantially uniform heating of the products.

The primary object of the present invention is to provide improved containers in which the comestible products can be packaged for dispensing thereof in vending apparatus of the type set forth in the above-identified copending application or the like.

More particularly, it is an object of the present invention to provide, for comestible products or the like, improved dispensing containers which are sturdy in construction, so as to protect the products placed therein, but which nevertheless permit such products to be so exposed to external heat sources on opposite sides thereof as to be readily heated thereby.

A further object of this invention is to provide improved dispensing containers as aforesaid in which the comestible products to be dispensed can be packaged conveniently, and from which such products can be removed easily.

Still a further object of this invention is to provide improved dispensing containers as aforesaid which can be stored compactly in vending apparatus of the type set forth and which will protect the products against accidental damage during normal handling thereof.

Another object of this invention is to provide improved dispensing containers as aforesaid which will safely confine the comestible products stored therein against accidental displacement therefrom during handling through the vending apparatus, and especially during delivery thereof to the purchaser.

Still another object of this invention is to provide improved comestible product containers which will permit practically unimpeded heating of the products stored therein.

Yet another object of this invention is to provide improved dispensing containers which can be made up from punched blanks capable of being stored flat in stacks prior to being set up in container form whereby the blanks will occupy a minimum of storage space.

It is also an object of this invention to provide improved dispensing containers as aforesaid which are simple in construction, easy to manufacture, economical in cost, and sturdy and highly efficient in use.

In accordance with the present invention, the containers for the comestible products may comprise tray-like members open at the top and having a bottom or floor, two upstanding side walls, and two end walls which have short, laterally folded flanges extending therefrom. These flanges may extend either outwardly away from their respective end walls, or they may extend inwardly therefrom somewhat over the open top of the tray. In either case, they are disposed substantially horizontally and act as shelves or supports for next higher trays stacked vertically thereon. In each case, the top of the tray remains open, and the bottom or floor of each tray has portions thereof removed therefrom. Thus, heat can readily penetrate to the content of each tray both through the open top and through the effectively open bottom thereof. In the tray structures where the end wall flanges are folded inwardly over the open top of the tray, these flanges act to confine the products in the trays from accidental displacement from the trays or containers. On the other hand, if the flanges are folded outwardly from the end walls, these end walls are preferably formed on a slant or at an angle to the tray floor such that the ends of the pretzels or the like can be slipped under these slanted ends to be confined against accidental displacement from the containers.

The novel features of the present invention, both as to its organization and method of operation, as well as additional objects and advantages thereof, will be understood more readily from the following description, when read in connection with the accompanying drawings, in which:

FIGURE 1 is a plan view of a blank from which one form of container may be formed according to the present invention, FIGURE 2 is a perspective view of the blank of FIGURE 7 in partly folded condition, FIGURE 3 is a perspective view of a completely folded tray or container formed from the blank of FIGURE 1 and showing one way of interlocking the folded parts to retain them in folded form or condition, FIGURE 4 is a side elevation of a tray similar to that of FIGURE 3 but showing a different way of retaining the folded parts in folded condition, and FIGURE 5 is a side elevation of another form of tray or container according to the present invention.

Referring, first, to FIGURES 1 to 3, there is shown a container 101 which may be stamped and formed from a generally rectangular blank 103 of suitable material, such as sheet aluminum, cardboard, plastic material capable of withstanding the radiant heat from the heaters of the type disclosed in the above-identified copending application, Ser. No. 380,456, or the like. The blank 103 is formed with a pair of longitudinally extending bend lines 105, a pair of transversely extending bend lines 107, and a plurality of V-notches 109 to provide, within the central area bounded by the lines 105 and 107, a rectangular bottom or floor 111, and also a pair of side wall sections 113, a pair of end wall sections 115, and a plurality of flaps 117 which extend from the end wall sections 115 adjacent the corners of the bottom 111. The side wall sections 113 are formed with generally U-shaped slits 119 to provide tongues 121 which can be pressed outwardly, and the flaps 117 are formed with slits 123 to provide locking tabs 125. When the sections 113 are bent up along the bend lines 105 to an upright position perpendicular to the bottom 111, they form the upstanding side walls of the container 101. Similarly, when the sections 115 are bent up along the bend lines 107 to an acute angular relation with the bottom 111, as shown in FIGURE 3, they form the upstanding end walls of the container. The flaps 117 can then be bent along the lines 105 and interlocked with the side walls 113 by pressing the tongues 121 outwardly somewhat and inserting the locking tabs 125 through the openings thus provided in the side walls to enable the locking tabs to engage the inner surfaces of the side walls. The end wall sections 115 can then be pulled back somewhat to thus lock the side and end walls in place relative to the bottom and thereby provide a tray-like container with an open top.

It will be noted that the end walls 115 are inclined in diverging relation in a direction from the open top of the container 101 to the bottom 111 thereof. Thus, the inclined end walls 115 overlap the bottom of the container 101 which is made of such length that, when a pretzel, for example, is placed therein, the ends of the pretzel will extend under the overlapping end walls 115. The inclined end walls 115 thus confine the pretzel against accidental displacement from the container 101 during handling of the respective packages, and especially as they slide down a delivery chute such as forms a part of the vending apparatus of the above-identified, copending application. To further protect the pretzels or other contents of the containers and to permit uniform and secure stacking of the packages in the respective magazines forming part of the aforesaid vending apparatus, the end wall sections 115 are formed with bend lines 127 to provide flange sections 129. These flange sections are bent outwardly away from the open top of each container along the bend lines 127 to extend laterally from and into overlapping relation with the inclined end walls 115. The flanges 129 provide shelf-like supports on which the next higher containers can rest in the respective magazines. The side walls 113 and the end walls 115 are of such height that, when the containers 101 are stacked on each other, as above described, the bottom or floor 111 of each relatively upper container will be spaced from the pretzel or other article or product in the container immediately thereunder to provide safe storage for pretzels or the like.

Since the open top of each container exposes the product packaged therein to the ambient, it is obvious that such product will be readily exposed to radiant heat from the upper one of a pair of vertically spaced and aligned heating units between which a discharged package is held stationary temporarily prior to delivery to a customer, as more fully set forth in the above-identified, copending application. To insure that radiant heat from the lower one of these two heating units will also reach the product and thus enhance the heating thereof, the bottom or floor 111 of each container is provided with as many openings 131 as possible while leaving ample support for the product in the container. Thus, the product in the container is also exposed to the ambient and to the radiant heat from underneath by the effectively open bottom of the container.

The form of container shown in FIGURE 4 is similar to that shown in FIGURE 3. However, in the container 101 of FIGURE 4, the slits 121 and 123 are omitted, and the flaps 117 are secured to the outer surfaces of the side walls 113 by a suitable adhesive 133 which will not deteriorate when subjected to heat.

In FIGURE 5, there is shown a container 101 wherein the end walls 115, like the side walls 113, are perpendicular to the bottom or floor 111. Here, however, the flanges 129a extend laterally from the end walls 115 inwardly over and into the overlapping relation with the open top of the container. In this case, the flanges 129a rest on the upper edges of the side walls 113 and serve not only as shelf-like supports for next higher containers in the stack, but also to confine the contents of the respective containers against accidental displacement therefrom. The flaps 117a in this form of container are again extensions of the flanges 129a and are bent over onto the side walls 113 to which they can either be secured by an adhesive, as in FIGURE 4, or with which they can be suitably interlocked through inclined slits 123a.

As is apparent from the foregoing description, there have been provided improved containers for packaging comestible and other products which may require heating before delivery thereof, the containers being especially suitable for use in vending apparatus of the type disclosed in the above-identified, copending application. Although only two forms of such containers have been described herein, it will undoubtedly be apparent to those skilled in the art that other forms thereof, as well as changes in the forms described, all coming within the spirit of this invention, are possible. It is desired, therefore, that the foregoing description shall be considered merely as illustrative, and not in a limiting sense.

What is claimed is:

1. A blank adapted to be formed into a tray-like container, said blank being generally rectangular in form and having
   (a) a pair of longitudinally extending bend lines spaced from the longitudinal edges of said blank to define opposed side walls,
   (b) a first pair of transversely extending bend lines spaced from the transverse edges of said blank to define opposed end walls,
   (c) said longitudinally extending bend lines and said transversely extending bend lines together defining a bottom for said container, said bottom having openings of substantial size therein,
   (d) means for joining said side walls and said end walls when they are bent up on their respective said bend lines into upstanding relation with said bottom to thereby retain them in said upstanding relation, and
   (e) a second pair of transverse bend lines between said first pair of transverse bend lines and the respective transverse edges of said blank, said blank being bendable along said second pair of transverse bend lines to provide flanges extending from said end walls and terminating at said transverse edges of said blank in spaced relation to said bottom, said flanges being adapted to support thereon a similar container in spaced relation to said bottom.

2. A blank according to claim 1 wherein said first transverse bend lines and said joining means are so related that, when said end walls and said side walls are joined to each other, said end walls will be positioned at an acute angle relative to said bottom and will overlap said bottom.

3. A container for articles to be dispensed in heated condition, said container having a bottom, side walls and inclined end walls upstanding from said bottom, said end walls extending inwardly over said bottom at an acute angle thereto whereby to overlap said bottom somewhat, said end walls being thereby adapted to confine against accidental displacement from said container an article of substantially the length of said bottom loaded therein, said container being open at the top and said bottom having openings of substantial size therein whereby to expose said article to the exterior of said container through both said open top and said openings so that heat from vertically spaced heat sources external to said container between which said container may be placed with said article loaded therein can readily reach said article from opposite sides thereof, and flanges extending laterally outwardly from said inclined end walls in overlapping relation with said end walls and terminating in free edges spaced from said bottom, said flanges providing shelves on which a like container can be supported in spaced relation to said article loaded in said container.

References Cited by the Examiner

UNITED STATES PATENTS

| | | |
|---|---|---|
| 1,906,964 | 5/1933 | Hill. |
| 2,281,165 | 4/1942 | Miller _____ 229—32 X |
| 2,368,797 | 2/1945 | Bailar. |
| 2,528,900 | 11/1950 | Meller _____ 229—35 |
| 2,555,655 | 6/1951 | Painter _____ 229—32 |
| 2,580,181 | 12/1951 | Meller _____ 229—35 |
| 2,967,653 | 1/1961 | Protz _____ 229—30 |
| 3,016,180 | 1/1962 | Struble _____ 229—30 X |

GEORGE O. RALSTON, *Primary Examiner.*